United States Patent [19]

Peschka et al.

[11] Patent Number: 4,608,830
[45] Date of Patent: Sep. 2, 1986

[54] METHOD AND APPARATUS FOR THE AUTOMATIC REFILLING OF A LIQUID HYDROGEN TANK IN A MOTOR VEHICLE

[75] Inventors: Walter Peschka, Sindelfingen; Gottfried Schneider; Willi Nieratschker, both of Stuttgart, all of Fed. Rep. of Germany

[73] Assignee: Deutsche Forschungs- und Versuchsanstalt für Luft- und Raumfahrt e.V., Bonn, Fed. Rep. of Germany

[21] Appl. No.: 676,001

[22] Filed: Nov. 29, 1984

[30] Foreign Application Priority Data

Dec. 10, 1983 [DE] Fed. Rep. of Germany ....... 3344770

[51] Int. Cl.[4] .............................................. F25B 7/00
[52] U.S. Cl. ............................................ 62/7; 62/48; 62/55; 123/541; 123/DIG. 12
[58] Field of Search ............... 123/DIG. 12, 527, 575, 123/576, 577, 578, 541; 62/7, 48, 55

[56] References Cited

U.S. PATENT DOCUMENTS

| | | | |
|---|---|---|---|
| 3,646,924 | 3/1972 | Newkirk et al. | 123/578 |
| 3,783,849 | 1/1974 | Bramfitt | 123/576 |
| 4,292,062 | 9/1981 | Dinulesu et al. | 62/7 |
| 4,421,087 | 12/1983 | Schuurman | 123/577 |
| 4,503,832 | 3/1985 | Pefley et al. | 123/541 |
| 4,520,763 | 6/1985 | Lynch et al. | 123/527 |

FOREIGN PATENT DOCUMENTS 72786 2/1893 Fed. Rep. of Germany .
82783 4/1894 Fed. Rep. of Germany .
640990 4/1935 Fed. Rep. of Germany .

OTHER PUBLICATIONS

Peschka: "Operating Characteristics of a LH2-Fuelled Automotive Vehicle & of a Semi Automotive LH2 Refuelling Station", *International Journal of Hydrogen Energy,* vol. 7(8), 661–669 (1981).

Peschka et al. "Cryogenic Hydrogen Storage and Refueling for Automobiles", Proceedings of the Second World Hydrogen Energy Conference; Zurich, Switzerland, Aug. 21–24, 1978, vol. 4, 1917–1928.

*Primary Examiner*—Ronald C. Capossela
*Attorney, Agent, or Firm*—Kenway & Jenney

[57] ABSTRACT

In order to achieve efficient refueling with a method and an apparatus for the automatic refilling of a liquid hydrogen tank in a motor vehicle in which the tank is connected to a liquid hydrogen supply line as well as a hydrogen gas return line, it is proposed that prior to commencement of refilling the liquid hydrogen tank the liquid hydrogen supply line in the vehicle be connected to the hydrogen gas return line and that liquid hydrogen be passed through said lines in order to cool them whereby only after they have been cooled is the liquid hydrogen supply line connected to the liquid hydrogen tank. For this purpose, a bypass line connecting the liquid hydrogen supply line to the hydrogen gas return line is provided in the motor vehicle, and electrically operable closing valves are provided in the liquid hydrogen supply line downstream of where the bypass line branches as well as in the bypass line.

9 Claims, 1 Drawing Figure

U.S. Patent    Sep. 2, 1986    4,608,830
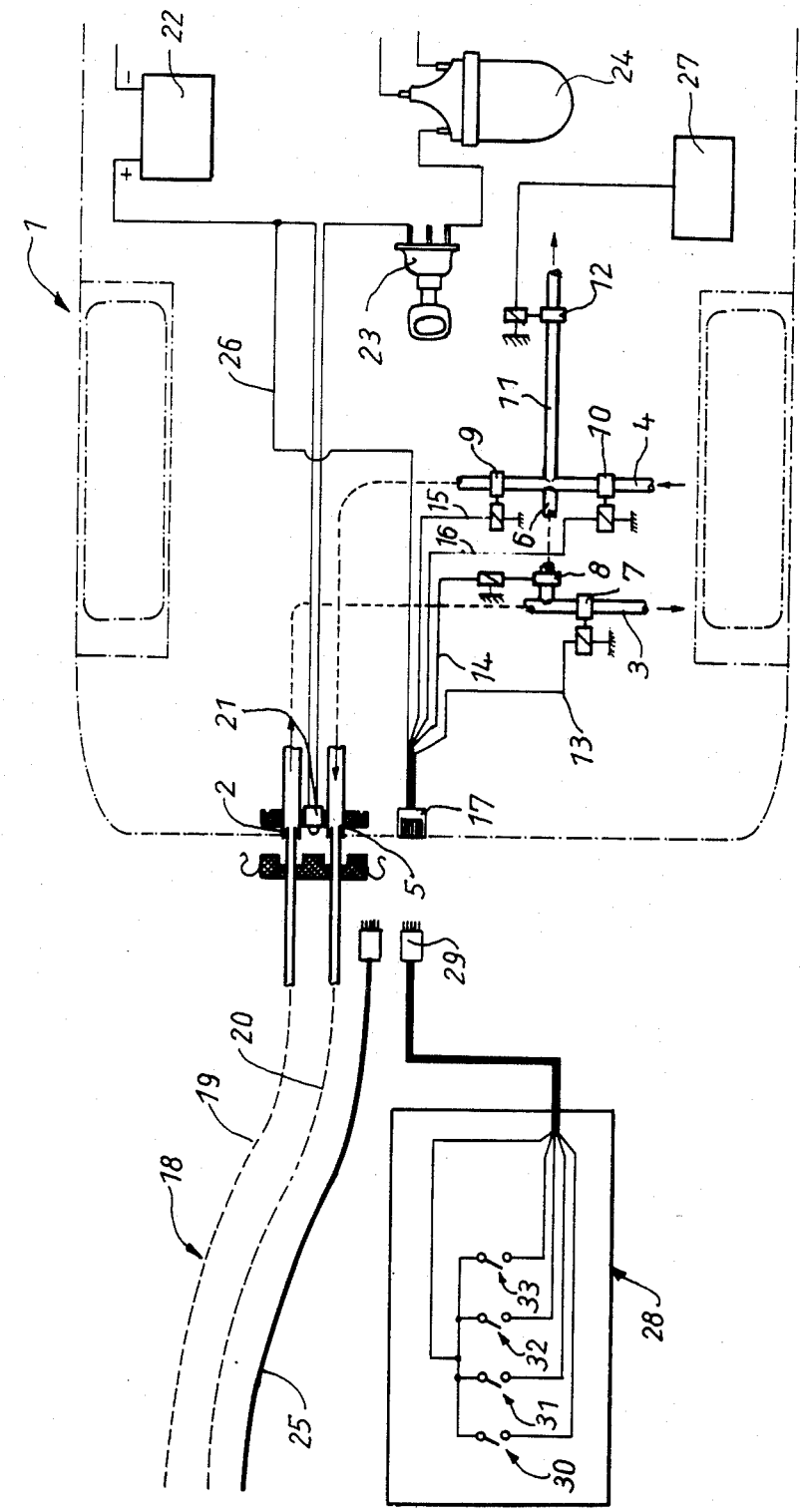

METHOD AND APPARATUS FOR THE AUTOMATIC REFILLING OF A LIQUID HYDROGEN TANK IN A MOTOR VEHICLE

The invention relates to a method for the automatic refilling of a liquid hydrogen tank in a motor vehicle in which the tank is connected to a liquid hydrogen supply line as well as a hydrogen gas return line. In addition, the invention relates to an apparatus for implementing said method with a tank line comprising a liquid hydrogen supply line and a hydrogen gas return line, said tank line being leak-tightly connectable to a tank neck on the motor vehicle.

Such apparatuses for refueling a liquid-hydrogen-powered motor vehicle are known, for example, from the following publications:

Hydrogen Energy System, Proceedings of the 2nd World Hydrogen Energy Conference, held in Zürich, Switzerland, 21–24 August 1978, Volume 4, Pages 1917 to 1928

Int. J. Hydrogen Energy, Volume 7, No. 8, Pages 661 to 669

DFVLR-Nachrichten No. 34, Pages 26 to 33.

With these apparatuses, various operations are initiated consecutively by a filling station control when refueling at the stationary filling station. Such operations include, for example, the evacuation of the tank line, the charging of the tank line with liquid hydrogen and the emptying of the tank line after refueling. These operations are basically controlled by the switching of various valves in a system of pipes. With the known methods, the tank line is connected to a corresponding neck on the motor vehicle whereby then the liquid hydrogen supply line and the hydrogen gas return line join directly into the hydrogen tank of the motor vehicle.

With these previously known apparatuses, fully automatic refueling is not possible; in particular, there are difficulties as regards the cooling of the lines in the vehicle.

The object of the invention is to improve a method of the generic kind such that the lines in the vehicle are also cooled before the liquid hydrogen is filled into the vehicle tank.

The object of the invention is achieved by a method of the initially described kind in that prior to commencement of refilling the liquid hydrogen tank the liquid hydrogen supply line in the vehicle is connected to the hydrogen gas return line and liquid hydrogen is passed through said lines in order to cool them whereby only after they have been cooled is the liquid hydrogen supply line connected to the liquid hydrogen tank.

The object of the invention is also achieved by an apparatus of the initially described kind which is characterized by a bypass line in the motor vehicle connecting the liquid hydrogen supply line to the hydrogen gas return line and by electrically operable closing valves in the liquid hydrogen supply line downstream of where the bypass line branches as well as in the bypass line.

Due to these measures, at the commencement of refueling the liquid hydrogen is not filled into the vehicle tank but passes via a bypass line into the hydrogen gas return line shortly before entering the liquid hydrogen tank. Consequently, both the liquid hydrogen supply line as well as the hydrogen gas return line are adequately cooled. Only after this cooling has taken place is the passage of the liquid hydrogen supply line into the vehicle tank opened, with the result that the actual refueling operation can commence.

It may further be provided that electrically operable valves are likewise disposed in the hydrogen gas return line upstream and downstream of where the bypass line joins. Preferably, a feed line leading to the engine of the motor vehicle branches between the two valves in the hydrogen gas return line. By appropriate actuation of the valves on either side of this branch, it is possible during vehicle operation to convey hydrogen gas via this line from the vehicle tank to the engine.

It is particularly advantageous if an electrical connection is disposed on the motor vehicle for control lines leading to the valves.

In a first preferred specimen embodiment it is provided that the tank line is assigned a control line which is connectable to the connection and through which control signals can be sent to the valves from the filling station control. In this design in which the control line may be executed such that it compulsorily connects to the connection when the tank line is connected, it is thus also possible for the in-vehicle valves to be controlled from the central control at the stationary filling station.

In a further preferred specimen embodiment, it is provided that a manually operable control is connectable to the connection whereby the valves are individually controllable through the intermediary of said manually operable control. With such a control the valves in the motor vehicle can also be suitably controlled even if the filling station does not have a control for providing control signals for the in-vehicle valves.

It is particularly advantageous if the valves are supplied with energy from the battery disposed in the motor vehicle; for this purpose, they are preferably designed to operate on the battery system voltage.

It is also favourable if the tank line connected to the motor vehicle operates a switch on the motor vehicle which interrupts the ignition circuit of the motor vehicle. This guarantees that the motor vehicle cannot be started while refueling.

With reference to the drawing, the following description of preferred embodiments of the invention serves to explain the invention in greater detail. The drawing shows a diagrammatic view of the in-vehicle system of lines to the liquid hydrogen tank of the motor vehicle.

In a motor vehicle 1 indicated by the dash-dotted line in the drawing there is a liquid hydrogen tank (not shown in the drawing) which is suitably surrounded by a vacuum jacket and is thus insulated from the environment. From a tank neck 2 on the motor vehicle a liquid hydrogen supply line 3 leads to the liquid hydrogen tank while from the gas space of the liquid hydrogen tank a hydrogen gas return line 4 leads to a second tank neck 5. Before reaching the liquid hydrogen tank, the liquid hydrogen supply line 3 and the hydrogen gas return line 4 are connected together by means of a bypass line 6.

An electrically operable closing valve 7 is disposed in the liquid hydrogen supply line 3 downstream of where the bypass line 6 branches. A further electrically operable closing valve 8 is situated in the bypass line 6, and on either side of where the bypass line 6 joins into the hydrogen gas return line 4 there is an electrically operable valve 9 and 10 respectively. Between the two valves 9 and 10 a feed line 11 branches from the hydrogen gas return line 4. This feed line 11 leads to the engine of the motor vehicle in a manner which is not apparent from the drawing. In this feed line 11 there is a further electrically operable valve 12.

The valves 7, 8, 9 and 10 are each assigned a control line 13, 14, 15 and 16, respectively, which all lead to a connection 17 on the outside of the motor vehicle. This connection 17 is disposed in the immediate vicinity of the two tank necks 2 and 5.

A tank line 18 is leak-tightly connectable to the two tank necks 2 and 5 and exhibits a liquid hydrogen supply hose 19 and a hydrogen gas return hose 20. When connected, the liquid hydrogen supply hose and the in-vehicle liquid hydrogen supply line, on one hand, as well as the hydrogen gas return hose and the in-vehicle hydrogen gas return line, on the other hand, are connected to each other gas-tight. To lock this connection, it is possible to provide a bayonet-type joint or another latch-type or snap-type connection of known kind.

Situated on the motor vehicle in the region of the two tank necks 2 and 5 is a switch 21 which is operated by the tank line 18 when the tank line is connected to the two tank necks 2 and 5. When operated, the switch 21 interrupts the supply of current from the vehicle battery 22 to the ignition lock 23 and to the ignition coil 24 of the motor vehicle, with the result that the motor vehicle cannot be started while the tank line is connected.

A control line 25 is connectable to the connection 17; connection may, for example, be by means of a normal plug-in connection. The control line 25 may be connected to the tank line 18 such that, when the tank line is connected to the tank neck, the control line is compulsorily connected to the connection 17. By way of the connection 17 the control lines 13, 14, 15 and 16 are connectable to a control (not shown in the drawing) in the stationary filling station. Furthermore, the control in the filling station is connected by way of the connection and the control line 25 to the battery 22 of the motor vehicle; for this purpose, a power-supply line 26 is routed from the battery 22 to the connection 17.

The valve 12 in the feed line 11 is operated by an in-vehicle control 27 which closes this valve 12 whenever the engine is switched off.

To refuel the motor vehicle, the tank line 18 is connected to the two tank necks 2 and 5 whereby the switch 21 simultaneously guarantees that the motor vehicle cannot be started while refueling. At the same time, the control lines 13, 14, 15 and 16 and the power-supply line 26 are connected to the control of the stationary filling station.

The filling station control initially closes the valves 7 and 10 and keeps the valves 8 and 9 open. With the valves in this position, the liquid hydrogen supply line and the hydrogen gas return line are evacuated and are then cooled by liquid hydrogen being passed through them.

After cooling, the valves 7 and 10 are opened while the valve 8 is closed. The liquid hydrogen now passes via the liquid hydrogen supply line 3 into the vehicle hydrogen tank while hydrogen gas that evaporates flows back via the hydrogen gas return line 4 to the filling station.

After refueling is completed, the valves 7 and 10 are closed; the valve 8 is opened. In this position the liquid hydrogen supply line and the hydrogen gas return line are evacuated and filled with nitrogen. The refueling procedure is thus completed; the tank line can now be removed again from the tank necks 2 and 5.

To operate the motor vehicle, hydrogen gas is fed from the tank via the open valves 10 and 12 to the engine whereby the other valves 7, 8 and 9 remain closed.

In this way, the refueling procedure can take place fully automatically; the in-vehicle valves are also controlled by the filling station control.

To be able to operate the valves in the motor vehicle even if the filling station does not have such a control, a manually operable control 28 is provided which is connectable to the connection 17 by means of a plug 29. This control 28 thus replaces the filling station control. This control 28 contains four switches 30, 31, 32, 33 which can be manually operated independently of each other. Each of these switches is assigned to one of the valves 7, 8, 9 and 10 in the motor vehicle so that, in this way, these valves can be manually operated in the manner in which they are normally operated by the automatic control of a filling station when refueling.

What is claimed is:

1. Method for the automatic refilling of a liquid hydrogen tank on a motor vehicle in which the tank is connnected to a liquid hydrogen supply line as well as a hydrogen gas return line, comprising:
   connecting the liquid hydrogen supply line in the vehicle to the hydrogen gas return line,
   passing liquid hydrogen through said lines in order to cool them,
   connecting the liquid hydrogen supply line to the liquid hydrogen tank only after said lines have been cooled, and
   commencing to refill the liquid hydrogen tank.

2. Apparatus for automatically refilling a liquid hydrogen tank on a motor vehicle, comprising:
   a tank line having a liquid hydrogen supply hose and a hydrogen gas return hose,
   a tank neck on the motor vehicle,
   means for connecting said tank line to said tank neck,
   a hydrogen supply line located in the motor vehicle and connected to said tank neck,
   a hydrogen gas return line located in the motor vehicle and connected to said tank neck,
   a bypass line located in the motor vehicle which connects said liquid hydrogen supply line to said hydrogen gas return line, and
   electrically operable closing valves in said liquid hydrogen supply line downstream of said bypass line and in said bypass line.

3. Apparatus as defined in claim 2, wherein electrically operable valves (10,9) are likewise disposed in the hydrogen gas return line (4) upstream and downstream of where the bypass line (6) joins.

4. Apparatus as defined in claim 3, wherein a feed line (11) leading to the engine of the motor vehicle (1) branches between the two valves (9,10) in the hydrogen gas return line (4).

5. Apparatus as defined in any one of claims 2, 3 or 4, wherein an electrical connection (17) is disposed on the motor vehicle (1) for control lines (13, 14, 15, 16) leading to the valves (7, 8, 9, 10).

6. Apparatus as defined in claim 5, wherein the tank line (18) is assigned a control line (25) which is connectable to the connection (17) and through which control signals can be sent to the valves (7, 8, 9, 10) from the filling station control.

7. Apparatus as defined in claim 5, wherein a manually operable control (28) is connectable to the connection (17), whereby the valves (7, 8, 9, 10) are individually controllable through the intermediary of said manually operable control (28).

8. Apparatus as defined in claim 2, wherein the valves (7, 8, 9, 10) are supplied with energy from the battery (22) disposed in the motor vehicle (1).

9. Apparatus as defined in claim 2, wherein the tank line (18) connected to the motor vehicle (1) operates a switch (21) which interrupts the ignition circuit of the motor vehicle (1).

* * * * *